May 4, 1965

R. B. STERNS ETAL 3,181,403

CONTROL SYSTEM

Filed Aug. 3, 1962

INVENTORS
ROBERT B. STERNS
BY DONALD J. MAHONY
HERMAN G. MEYER, JR.

Ward, Neal, Haselton, Orme + McElhannon
ATTORNEYS

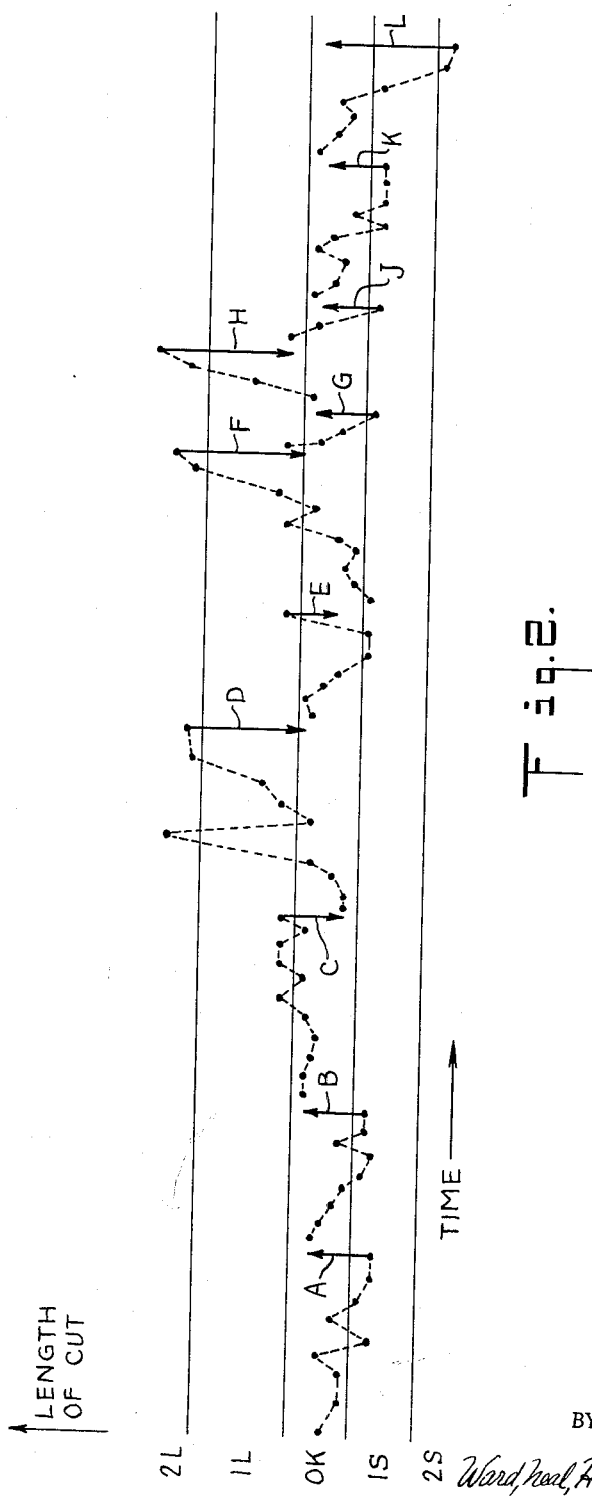

3,181,403
CONTROL SYSTEM
Robert B. Sterns, Great Neck, and Donald J. Mahony, White Plains, N.Y., and Herman G. Meyer, Jr., Newark, N.J., assignors to Logic Systems, Inc., Great Neck, Long Island, N.Y., a corporation of New York
Filed Aug. 3, 1962, Ser. No. 214,679
10 Claims. (Cl. 83—76)

This invention relates to the regulation of manufacturing operations and more particularly it concerns a method and means for improving the quality of manufacturing operations with a decreased amount of regulatory control.

Regulation or control of a manufacturing operation is generally achieved by measuring a given characteristic resulting from the operation, and then adjusting a control element according to the amount by which this resulting characteristic deviates from a desired value. The control element modifies the operation in degenerative fashion to bring the output characteristic into conformity with the desired value. In order to compensate adequately for changing environmental conditions, it has been the practice to produce this control adjustment as quickly and directly as possible. Very often continuous automatic feedback control is provided. In cases where this is not possible, such as in intermittent type manufacturing operations where individual items are produced in successive operations, rapid adjustment has been produced by utilizing measurements obtained after one operation to reset the system for the next succeeding operation.

According to the present invention, instead of providing more and faster feedback control, improvement in regulation is achieved by providing less but more selective control. This improvement is based on the fact that the measured value of a manufactured item at any instant represents the results of both controllable and uncontrollable variables affecting the operation. This is due to the fact that a certain amount of manufacturing tolerance exists for which no amount of regulatory control will compensate. This occurs in all realistic systems and is caused by such things as slippage, blacklash, flexure, etc., whereby for a given setting of the system performing the operation, the measure output quantity may take any value within a certain tolerance range. Manufacturing tolerances can be reduced, of course, with close control of raw materials and improved processing apparatus, but the extent of such tolerance reduction is limited by both cost and practicality.

According to the present invention, recognition is given to the fact that the uncontrollable variables represented in each output measurement occur in random manner while the controllable variable, at least insofar as it is controlled, does not. Thus for many measurements taken over a long period of time during the occurrence of the manufacturing operation, the measured quantities assume a statistical or Gaussian distribution, the mean value of which represents only the controllable variable. By detecting this means value and adjusting the control element based solely on its deviation from a desired value, a more accurate yet less active mode of control is provided.

In theory, an infinite number of individual measurements are required to ascertain the precise value of the statistical mean. The preferred embodiment however, utilizes only a few measurements and compares them according to a prearranged program to obtain the most probable value of their statistical mean. This comparison program is defined by setting a desired balance between speed of correction and accuracy of correction. Basically, it entails the comparison of the number of occurrences of measurements of different values. Whenever a preselected number of measurements occur at a given value, a corresponding correction is made. Means are further provided to sense the rate at which the measured values change and to superimpose further correction based on this.

It is a general object of this invention to provide means for improving the regulation of manufacturing operations.

A more specific object is to provide such regulation based upon a determination of the value of a controllable variable in the system.

There has been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 2 is a diagram illustrating typical operating characteristics of the preferred embodiment.

Figure 1:
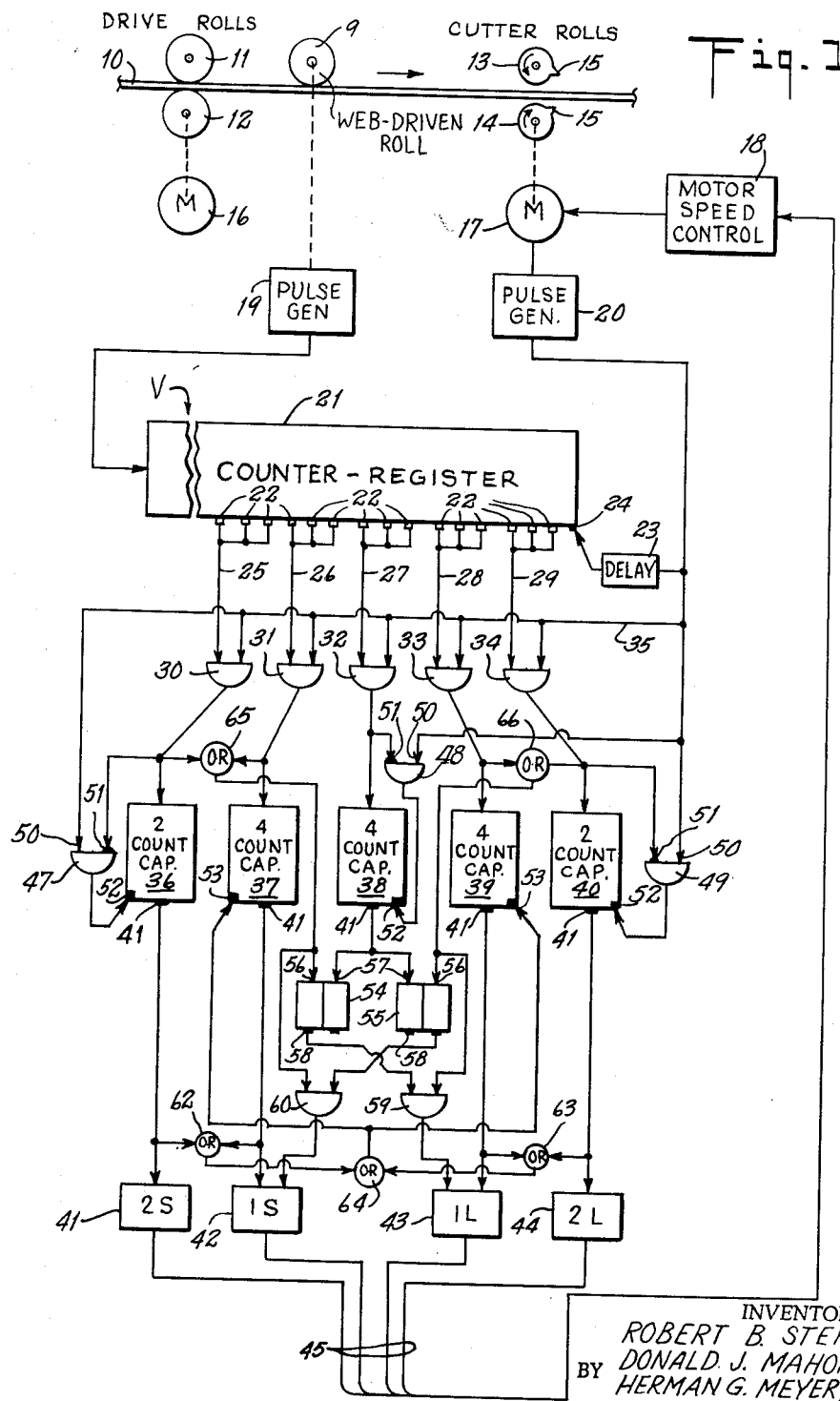
FIG. 1 is a schematic illustrating a preferred embodiment of the invention.

The embodiment of FIG. 1 is shown as applied to control the operation of a precision cut-off device. In this device a continuous sheet or web 10 is driven by means of a pair of drive rolls 11 and 12 toward a pair of cutter rolls 13 and 14. The cutter rolls have shear blades 15 extending from their periphery which sever the web 10 upon each complete rotation. The length of the severed web pieces depends upon the distance the web 10 moves past the cutter rolls between successive operations of the shear blades. This in turn depends upon the ratio maintained between the linear velocity of the web 10 and the rotational velocity of the cutter rolls 13 and 14.

A constant speed drive roll motor 16 is provided to rotate the drive rolls 11 and 12. The cutter rolls 13 and 14 are rotated by means of a variable speed cutter roll motor 17 whose rotational velocity is varied by means of a motor speed control device 18. A web driven roll 9 is also provided between the drive and cutter rolls. It will be seen that the cut length of each web piece depends upon the ratio of the speeds of the cutter rolls 13 and 14 and the web driven roll 9. This ratio is adjustable by means of the motor speed control 18. As will be described more fully, means are provided to detect the length of cut for successive operations of the shear blades, and then based upon the most probable statistical means deviation of these lengths, from a desired value, to adjust the motor speed control device 18 in a degenerative manner to bring this means into conformity with that value.

A first pulse generator 19 is provided to produce a given number of voltage pulses for each complete rotation of the web driven roll 9. The number of pulses produced in any interval thus represents the amount of movement of the web 10 in that interval. A second pulse generator 20 is provided to produce a single voltage pulse for each complete rotation of the cutter rolls 13 and 14. This occurs when the shear blades 15 come together to sever the web 10. It will be seen that the number of voltage pulses produced by the first pulse generator 19 between successive pulses from the second pulse generator 20, provides an indication of the length of web material which has last been cut.

The output pulses from the first pulse generator 19 are supplied to the input of a main counter-register 21. The main counter-register includes a plurality of output terminals, designated as 22, which represent different numbers of accumulated input pulses. The particular output terminal upon which a finite voltage appears at any given time indicates the number of pulses which have been accumulated in the counter at that time. Those skilled in the art will readily apprehend several possible arrangements of well known elements such as coincidence circuits and bistable switches which can be adapted to perform these functions. In a preferred arrangement, the counter capacity would be adjustable between the point at which input signals are applied and the output terminals representing the highest count. This permits adjustment of the automatic control so that different lengths of web may be cut. Inasmuch as variable capacity counters of this type are relatively well known, the counter is merely illustrated in block form and is shown to be broken as at V to indicate its variable capacity. The output pulses from the second pulse generator 20 are directed via a pulse delay means 23 to a reset terminal 24 in the counter-register 21. This permits the counter to be cleared upon the occurrence of each cut. Each web piece which is cut is seen to be measured by the number of pulses stored in the counter between successive clearing pulses from the second pulse generator 20.

While high accuracy in the measurement of the length of each particular cut will ensure greater accuracy in correction, it has been found expedient from the standpoint of both economy and reliability merely to indicate each measurement according to which of several length zones it represents. The length zones may be established by controlling the amount of linear distance traveled by the sheet material for each pulse produced by the first pulse generator 19. Thus if each pulse represents one inch of linear travel for the web, the fourth terminal to produce a voltage represents a web movement or length of cut anywhere from four to five inches. The length zones may be adjusted as to width by interconnecting groups of output terminals as shown in FIG. 1.

According to the preferred embodiment, five length zones have been chosen and are designated respectively as the 2S, 1S, 0K, 1L and 2L zones. A length of cut occurring in any such zone produces a voltage at a corresponding pulse supply lead 25–29. By adjusting the count capacity of the main counter-register 21 so that a length measurement for a desired length of cut produces a voltage on the 0K zone pulse supply lead 27, the zone arrangement is made to represent deviations of lengths of cut from desired values.

A signal gating arrangement is provided to prevent the occurrence of voltage signals at the output ends of the pulse supply leads during the count buildup in the main counter-register 21 between successive cuts. The signal gating arrangement includes a number of dual input terminal AND circuits 30–34, each having one input terminal connected to a corresponding pulse supply lead. The remaining input terminal of each AND circuit is connected via a common lead 35 to receive signals from the second pulse generator 20 upon the occurrence of each cut. The AND circuits produce an output signal only upon the coincidence of finite signals at both inputs. Therefore output signals appear at the output of the signal gating arrangement only upon the occurrence of a cut and only from the AND circuit connected to the pulse supply lead representing the length deviation zone within which the length of cut occurs.

A plurality of signal storage elements 36–40 are provided to store prescribed numbers of signals which pass through corresponding AND circuits. Each signal storage element has a capacity output terminal 41 upon which a voltage appears whenever the number of signals applied to the element reaches a set count. These capacity output terminals are connected to associated correction amplifiers 41–44 which, when activated by signals from the capacity output terminals, generate correction voltages of prescribed magnitude and polarity. The correction voltages are applied via associated feedback lines 45 to adjust the motor speed control means 18, in a degenerative manner. This in turn changes the rotational speed of the cutter rolls in a manner to change the length of cut produced on the web 10.

The signal storage elements may be conventional pulse counting devices. Their individual count capacities are set according to a number of considerations including the speed and accuracy of correction desired, the number of zones and the tolerance characteristics of the cutting device itself. In general, however, it may be said that their relative capacities should be distributed to resemble a standard deviation curve centered about the 0K zone. Thus the count capacities of the storage elements 37, 38 and 39, in the 1S, 0K and 1L zones, respectively, should be greater than the capacity of the storage elements 36 and 40 in the 2S and 2L zones. In the present embodiment, a four count capacity for the storage elements in the 1S, 0K and 1L zones and a two count capacity for the storage elements in the 2S and 2L zones was found to produce good results.

An additional refinement is provided on certain of the signal storage elements, namely those which receive signals occurring within the 2S, 0K and 2L zones. According to this refinement, these particular storage elements continue to store signals only while successive measurements continue to produce signals which occur in the particular zone represented by the element. Should a measurement subsequently produce a signal in a different zone, the first storage element becomes cleared. This is accomplished by the provision of INHIBIT gate circuits 47, 48 and 49 in conjunction, respectively, with each of these three storage elements. The INHIBIT gate circuits each include a first input terminal 50 connected to receive signals from the second pulse generator 20, and an inhibit terminal 51 connected to receive input signals from the same AND circuit as its associated storage element. The INHIBIT gate circuits are similar in construction to the AND circuits except that provision is made whereby an output signal is produced if a signal appears at the first input terminal but not if another signal is being received at the inhibit terminal. Such circuits are well known in the digital computer field and typical examples suitable for use in the present environment are shown on pages 401–403 of the book entitled Pulse and Digital Circuits by Jacob Millman and Herbert Taub, published by the McGraw-Hill Book Co., New York, 1956. The output signals from the INHIBIT gate circuits are applied to reset terminals 52 on their associated pulse storage elements 36, 38 and 40. Each of these pulses storage elements continues to store signals as long as they continue to occur in the zone represented by the element. However, should a length of cut subsequently occur which produces a signal in another zone, no signal would then be available at the inhibit terminal 51 of the INHIBIT gate circuit to prevent an output signal from being produced by the pulse supplied from the second pulse generator 20; and the storage element would then become cleared or reset by this signal being applied at its reset terminal 52.

The output of each signal storage element, except that representing the 0K zone, is further connected through associated OR circuits 62–64, to a reset terminal 53 on the 1S and 1L zone storage elements. Thus, whenever a correction is produced by the occurrence of a signal from a storage element capacity output terminal, each of the other storage elements, except the 0K storage element 38, becomes cleared to a zero count. The particular storage element which becomes overloaded however, is not cleared and continues to produce correction signals as long as measurement deviations occur in its particular zone.

The system thus far described is effective to ascertain with reasonable accuracy the most probable location of the statistical mean deviation of a small number of measurements. Very often however this mean itself may be shifting beyond acceptable limits during the measurement period. It has been found that if signals occur in either the 2S or 1S zones within a certain number of measurements after having occurred in either the 2L or the 1L zones, or vice versa; the probability that the mean deviation is shifting is high enough to warrant immediate correction.

This detection of this probable shift is accomplished by providing a pair of bistable switching elements such as flip-flop circuits 54 and 55. Each flip-flop circuit includes a trigger input terminal 56, a reset input terminal 57 and at least one output terminal 58. The voltage level at the output terminal at any time depends upon which of the input terminals last received a voltage pulse. The circuit is considered "triggered" whenever this output voltage is finite, as when the last applied pulse occurred at the trigger input terminal 56; and is considered "reset" whenever this output voltage is zero as when the last applied pulse occurred at the reset input terminal 57.

The first flip-flop circuit 54 is connected by means of an OR circuit 65 to be triggered as a result of input signals being supplied to either the 2S or 1S signal storage elements 36 or 37. These signals are also applied to the trigger input terminal 56 of the first flip-flop circuit 54. Likewise, the second flip-flop circuit 55 is connected by means of an OR circuit 66 to be triggered by signals supplied to either the 2L or 1L zone signal storage elements 39 or 40. Each of the flip-flop circuits is reset by the output from the signal storage element 38 in the 0K zone; which occurs whenever at least four consecutive measurements produce signals in this zone.

The output terminal of the first flip-flop circuit 54 is connected to one input terminal of an L zone AND circuit 59 while the output terminal of the second flip-flop circuit 55 is connected to one input terminal of an S zone AND circuit 60. Also the trigger input connection to the first flip-flop circuit 54 is further connected to the remaining input terminal to the L zone AND circuit 59 while the trigger input connection to the second flip-flop circuit is further connected to the remaining input terminal to the S zone AND circuit 60. The output terminals of the S zone and L zone AND circuits are connected respectively to the 1S and 1L correction amplifiers 43 and 44.

In operation of the system, the web 10 is driven continuously by means of the drive rolls 11 and 12, past the cutter rolls 13 and 14 where it is periodically severed by the shear blades 15 into individual lengths.

During this time measurement signals are produced in accordance with each severed length. These signals are assigned on the basis of indicated length to the various storage elements 36–40. Correction signals are obtained from the storage elements depending upon the manner in which the measurement signal becomes distributed among them. These correction signals represent the most probable statistical mean deviation from a desired value of the various measured lengths or, in some instances, the most probable shift in this mean deviation. The correction signals are then used to change the setting of the motor speed control 18, which in turn changes the rotational velocity of the cutter rolls 13 and 14 to affect a length of cut adjustment for the system.

The various length measurement signals are produced in digital fashion to facilitate their assignment based on measured length to the storage elements which represent the various length deviation zones. Whenever the web 10 becomes severed by the shear blades 15, a front or leading edge of a particular length is formed. When this occurs, the second pulse generator 20 supplies a pulse through the delay means 23 to the reset terminal 24 which clears the main counter-register 21. As the web 10 continues to move past the cutter rolls 13 and 14, a succession of pulses, produced by the first pulse generator 19, are supplied at the input of the main counter-register 21. Depending upon the calibration of the first pulse generator, the number of these pulses indicates the distance which the leading edge moves past the shear blades 15. The particular number of input pulses applied to the counter since the last previous clearing pulse (and since the leading edge of the sheet began to move past the shear blades 15), is seen in the particular one of the several output terminals 22 which is at a finite voltage. Since each of the output terminals is connected via an output lead 25–29 to a corresponding AND circuit 30–34, each AND circuit in succession receives a finite voltage and thus becomes potentially capable of supplying a pulse signal to an associated signal storage element 36–40.

The next subsequent operation of the shear blades 15 forms the trailing edge of the particular cut length. The pulse produced at this instant by the second pulse generator 20 is immediately supplied to the remaining input terminals of each of the AND circuits. This causes the particular AND circuit, which at the same instant happens also to be receiving a finite voltage from its corresponding input lead, to pass a pulse signal to its associated storage element. In order to allow the AND circuit to deliver this signal, the delay circuit 23 prevents clearing of the main counter-register, and consequent removal of voltage from the AND circuit input terminal, for a short time after the occurrence of the output pulse from the second pulse generator 20.

The particular signal storage element receiving a pulse signal is dependent upon the number of counts which accumulate in the main counter-register between the times it is cleared at the occurrence of the leading and trailing edge cuts. Since this number represents the length of cut, the storage element, as stated previously, may be considered as representing a length zone, or in the present case, a length deviation zone.

As successive lengths are cut and corresponding measurements made in the fashion described, the various storage elements 36–40 accumulate different numbers of applied signals. When the count in any storage element reaches the capacity of the element, an output signal is produced which activates a corresponding one of the correction amplifier circuits 41–44 to produce a voltage of proper magnitude and polarity to adjust the motor speed control element 18.

The relative capacities of the storage elements are such that more measurements must occur in the zones of moderate deviation (1S and 1L), in order to produce a corrective signal, than must occur in the zones of extreme deviation (2S and 2L). For any given setting of the motor speed control element 18, the resulting signals over a long period tend to assume a Gaussian distribution among the signal storage elements. The storage element receiving the greatest number of applied signals represents the mean value of this distribution. If the motor speed control element is correctly adjusted, then the distribution should occur among the storage elements such that very little correction is produced. If however the motor speed control element is incorrectly adjusted, the distribution shifts. A large shift will be detected quickly since the extreme deviation storage elements have low capacity and signals will be most likely to occur in these zones. Also any signal obtained as a result of an output from these storage elements produces a large corrective signal in the 2S or 2L correction amplifier. Smaller mean deviations require more measurements to detect and provide smaller corrective signals. As a result, the system is not subject to overcorrection with its associated strains and possible inaccuracies.

A refinement of the above signal distribution criteria is provided at the outside counters 36 and 40 which represent the extreme deviation zones 2S and 2L. According to this refinement, signals must occur successively in the particular extreme deviation zone if its storage element is to continue storage. Any signal produced in a different storage element causes clearing of these particular elements. This prevents large corrective signals from being developed should some unusual or erratic condition affect a single measurement without really influencing the long term effects of the cutting operation.

By providing a means for clearing each storage element upon the occurrence of each corrective signal, any distributional pattern which the signals assume among the various storage elements is made strictly a function of a given setting of the motor speed control element. This permits a more accurate and faster determination of the most probable mean deviation and consequently more efficient system control.

While the distribution of the signals stored among the various storage elements provides an indication of the most probable mean deviation of the measured lengths, it is conceivable that this mean deviation could be rapidly shifting during the time that measurements are being obtained. This shift is best detected by noting measurements which shift from one side of the OK zone to the other within a given number of cuts. Whenever a signal is applied to a signal storage element representing the 2S or 1S zone, the trigger input terminal 56 of the first flip-flop circuit 54 triggers that circuit so that a finite voltage appears at its output terminal 58, which voltage in turn is applied to one input terminal of the L zone AND circuit 59. The first flip-flop circuit remains in its triggered state indefinitely and is reset only by an output signal from the signal storage element 38 in the OK zone. When a measurement signal subsequently occurs in either the 1L or 2L zones prior to resetting of the first flip-flop circuit 54, a voltage signal is supplied to the remaining input terminal of the second AND circuit 59. Since the first terminal of this circuit has received a finite voltage from the first flip-flop circuit 54, it produces an output which activates the 1L correction amplifier 43, to produce an immediate correction signal independently of the particular arrangement of signals in the various storage elements. A similar correction occurs in the opposite direction whenever signals first occurring in the 2L or 1L zones are followed by signals which appear in either the 2S or 1S zones prior to the occurrence of four consecutive signals in the OK zones.

A typical sequence of operation for the preferred embodiment is shown graphically in FIG. 2. Here the lengths of successive cuts, shown as dots, are plotted against time. The length of cut coordinate in the plot is shown as being divided into five zones, designated respectively as the 2S, 1S, OK, 1L and 2L zones. These coincide with the various length deviation zones represented by the various storage elements 36–40 of FIG. 1. Although as shown in the diagram, the various cut lengths may take any of several values within a zone, the system is arranged to operate only on the basis of the numbers of signals within the various zones and is insensitive to the precise position of any signal within a zone.

It will also be seen from the diagram of FIG. 2 that the zones do not have identical widths. The particular width assigned to each zone depends upon environmental situation to which the control system is applied. In the present case, it has been found that by expanding the 1L zone as shown, improved compensation is obtained for cutter velocity variations which occur when the system is turned on and off. This is accomplished merely by connecting the pulse supply lead 28 to a greater number of terminals 22 in the main-counter register 21.

The arrows shown in the graph indicate the various corrections introduced by the correction amplifiers 41–44. These four amplifiers provide four different types of correction, two in magnitude and two in direction; each of which has been represented in FIG. 2. The various correction indicating arrows are identified as A, B, C, etc. The first correction A is of low magnitude and directed toward the L zones. This correction is seen to result from four cut lengths producing signals in the 1S zone storage element 37. This correction occurs even though the signals do not occur consecutively. Once the correction is made however, the 1S zone storage element is reset and four more cut lengths producing signals in the 1S zone must occur before the second corrective signal B occurs. The third indicated correction, C, is also of low magnitude but in the opposite direction of the previous corrections. This correction results from four cut lengths producing signals in the 1L storage counter 39. The next subsequent correction D, is of high magnitude and toward the S zones, and occurs as the result of two consecutive signals accumulating in the 2L storage element 40.

The next correction E is of low magnitude and is directed toward the S zones. This correction is produced by signals occurring first in the 1S zone and subsequently in the 1L zone. When signals shift from an S zone to an L zone, and vice versa, within a given number of cuts, there is a great likelihood that their mean deviation also is shifting and an immediate correction is provided irrespective of the number of counts which may have accumulated in any of the counter elements. However, should four consecutive signals occur in the OK zone before completion of this shift, an output signal from the OK zone signal storage element 38, operates to the flip-flop circuits 54 and 55. This removes the voltage from one terminal of the L zone and S zone AND circuits 59 and 60, and prevents correction signals from being applied through these circuits if a signal subsequently occurs to complete the shift.

The remaining corrections may be seen to follow the same criteria outlined above. These criteria may be adjusted as by changing the number of counter-register output terminals 22 connected to each output lead 25–29, or by changing the various count capacities of the storage elements 36–40. The exact manner of adjustment to produce optimum results will, of course, depend upon the particular application.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. Apparatus for controlling the length of cut produced by a cut-off device, said apparatus comprising, means for producing a continuous succession of voltage pulses having intervals representative of incremental distances by which material to be cut moves with respect to a cutting tool, means for producing a further pulse upon the occurrence of each cut made by said cutting tool, a main counter arranged to count the successive pulses and to be cleared by said further pulses, a plurality of signal storage counters having discrete count capacities, means for applying an input signal to one of said storage counters upon the occurrence of each further pulse, the particular storage counter being selected according to the number of pulses accumulated in said main counter at the instant of occurrence of each cut, each of said signal storage counters being arranged in isolation from the effects of the pulses directed into other signal storage counters so that the accumulated pulse count in each signal storage counter is unaffected by the sequence of application of pulses to said signal counters, means associated with each storage counter to produce upon overload a correction signal having an amplitude and direction which bears a given relationship to the number of pulses required in said main counter to supply an input signal at said storage counter, and means for adjusting said cut-off device to produce a different length of cut according to said correction signal.

2. Apparatus for regulating the operation of a manufacturing system which successively imparts a given characteristic to individual items, said apparatus comprising, means for generating measurement signals having magnitudes representative of measurements taken of said given characteristic on several successively produced items, a signal sorting means operable to assign each measurement signal to a particular signal path based upon the magnitude of the deviation of the signal from a desired value, signal counting means associated with each path and connected to receive the signals applied to the respective paths, each signal counting means having a discrete count capacity and being capable of producing an output signal upon the reception of a number of received signals in excess of said count capacity, said number being generally inversely proportional to the magnitude of signal deviation from desired value represented by its associated path, each of said signal counting means further being arranged in isolation from the effects of signals directed into other signal counting means so that the accumulated signal count in each signal counting means is unaffected by the sequence of occurrence of said measurement signals, means responsive to the occurrence of an output signal from said signal counting means for adjusting said manufacturing system to change the magnitude of said given characteristic, and means further responsive to the occurrence of an output signal from one of said counting means for clearing the other counting means.

3. The apparatus described in claim 2 further including means for clearing those signal counting means having the least count capacity upon failure of the particular signal counting means to receive consecutively occurring measurement signals.

4. The apparatus described in claim 2 further including means further responsive to the occurrence of an increase in count in one pulse counting means within a given number of operations of said device following an increase in count in a certain other counting means to produce a further corrective signal.

5. The apparatus described in claim 2 further including a dual input coincidence circuit responsive to the coincidence of voltages upon each of two input terminals to produce an output, a bistable switching means activated by the occurrence of a signal in one path to produce a continuous voltage at a first terminal on said voltage coincidence circuit, means for applying a voltage to the other input of said voltage coincidence circuit in response to the occurrence of a subsequent signal in another path, and means for producing a further corrective signal in response to outputs from said signal coincidence circuit.

6. The apparatus described in claim 5 further including means for deactivating said bistable switching means upon the occurrence of a prescribed number of signals in a third path prior to the occurrence of said subsequent signal.

7. Apparatus for regulating the operation of a manufacturing system which successively imparts a given characteristic to individual items, said apparatus comprising means for generating measurement signals having magnitudes representative of measurements taken of said given characteristic on several successively produced items, a plurality of signal storage devices, signal sorting means intermediate said signal measurement generating means and said signal storage devices for directing each measurement signal into a different signal storage device according to the magnitude of deviation of such signal from a desired value, each of said signal storage devices being arranged in isolation from the effects of signals directed into other signal storage devices so that the accumulated signal count in each signal storage device is unaffected by the sequence of occurrence of said measurement signals, means responsive to the accumulation in each individual signal storage device of a prescribed number of signals to generate a corresponding corrective signal, means for directing such corrective signals to adjust a control element within said manufacturing system to change the magnitude of said given characteristic according to said corrective signal, and means for clearing said storage elements of accumulated signals in response to the occurrence of each of said corrective signals.

8. The apparatus described in claim 7 wherein said given number of signals is generally inversely proportional to the magnitude of deviation from said desired value represented by the signals in each particular signal storage means.

9. Apparatus for regulating the operation of a manufacturing system which successively imparts a given characteristic to individual items, said apparatus comprising means for generating measurement signals having magnitudes representative of measurements taken of said given characteristic on several successively produced items, a plurality of signal storage devices, signal sorting means intermediate said signal measurement generating means and said signal storage devices for directing each measurement signal into a different signal storage device according to the magnitude of deviation of such signal from a desired value, each of said signal storage devices being arranged in isolation from the effects of signals directed into other signal storage devices so that the accumulated signal count in each signal storage device is unaffected by the sequence of occurrence of said measurement detection signals, means responsive to the accumulation in each individual signal storage device of a prescribed number of signals to generate a corresponding corrective signal, means for directing such corrective signals to adjust a control element within said manufacturing system to change the magnitude of said given characteristic according to said corrective signal, means for clearing said storage elements of accumulated signals in response to the occurrence of each of said corrective signals and means further responsive to each particular corrective signal to render such detection means unresponsive to signals which have occurred previous to said particular corrective signals.

10. Apparatus for regulating the operation of a manufacturing system which successively imparts a given characteristic to individual items, said apparatus comprising means for generating measurement signals having magnitudes representative of measurements taken of said given characteristic on several successively produced items, a plurality of signal storage devices, signal sorting means intermediate said signal measurement generating means and said signal storage devices for directing each measurement signal into a different signal storage device according to the magnitude of deviation of such signal from a desired value, each of said signal storage devices being arranged in isolation from the effects of signals directed into other signal storage devices so that the accumulated signal count in each signal storage device is unaffected by the sequence of occurrence of said measurement signals, means responsive to the accumulation in each individual signal storage device of a prescribed number of signals to generate a corresponding corrective signal, means for directing such corrective signals to adjust a control element within said manufacturing system to change the magnitude of said given characteristic according to said corrective signal, means for clearing said storage elements of accumulated signals in response to the occurrence of each of said corrective signals and means additionally responsive to the occurrence of said measurement signals within mutually displaced magnitude regions within a given number of said operations to produce a further corrective signal.

References Cited by the Examiner

UNITED STATES PATENTS

| 2,897,638 | 8/59 | Maker. | |
| 3,008,131 | 11/61 | Einsel. | |
| 3,048,751 | 8/62 | Taylor | 318—28 X |

FOREIGN PATENTS 849,771  9/60  Great Britain.

ANDREW R. JUHASZ, *Primary Examiner.*